US008041649B2

(12) United States Patent
Mougey et al.

(10) Patent No.: US 8,041,649 B2
(45) Date of Patent: Oct. 18, 2011

(54) METHODS AND SYSTEMS FOR POSTCODE-TO-POSTCODE DELIVERY INTERVAL AND ROUTING CALCULATION

(75) Inventors: Vincent J. Mougey, Alexandria, VA (US); Adrian B. Goulbourne, Silver Spring, MD (US); Ossam Manea, Leesburg, VA (US)

(73) Assignee: United States Postal Service, Washington, DC (US)

( * ) Notice: Subject to any disclaimer, the term of this patent is extended or adjusted under 35 U.S.C. 154(b) by 1098 days.

(21) Appl. No.: 10/953,575

(22) Filed: Sep. 30, 2004

(65) Prior Publication Data

US 2005/0256731 A1 Nov. 17, 2005

Related U.S. Application Data

(60) Provisional application No. 60/570,827, filed on May 14, 2004.

(51) Int. Cl.
G06Q 30/00 (2006.01)
(52) U.S. Cl. .......................... 705/330; 705/337; 705/331
(58) Field of Classification Search .................. 705/1, 4, 705/330, 331, 337
See application file for complete search history.

(56) References Cited

U.S. PATENT DOCUMENTS

| | | | | |
|---|---|---|---|---|
| 5,043,908 | A * | 8/1991 | Manduley et al. | 700/227 |
| 5,446,667 | A * | 8/1995 | Oh et al. | 705/406 |
| 6,292,784 | B1 | 9/2001 | Martin et al. | |
| 6,795,823 | B1 * | 9/2004 | Aklepi et al. | 707/10 |
| 6,963,861 | B1 * | 11/2005 | Boucher et al. | 705/400 |
| 2002/0010606 | A1 * | 1/2002 | Soga et al. | 705/7 |
| 2002/0032573 | A1 * | 3/2002 | Williams et al. | 705/1 |
| 2002/0072988 | A1 | 6/2002 | Aram | |
| 2002/0128930 | A1 | 9/2002 | Nakamoto et al. | |
| 2003/0093388 | A1 | 5/2003 | Albright | |
| 2003/0115072 | A1 | 6/2003 | Manucha et al. | |

OTHER PUBLICATIONS

Received Mar. 23, 1988 revised Aug. 25, 1988. Available online Jul. 4, 2002 Configuration of an overnight package air network; "PickUp and Delivery Systems" Hall, Randolph W. Department of Industrial Engineering and Operations Research and The Institute of Transportation Studies, University of California, Berkeley, California 94720, U.S.A.* Universal Postal Union, "Extraterritorial Offices of Exchange" Secretary General's Report (CA 2001-Doc 17c) Sep. 17, 2001.*
Supplementary European Search Report, mailed Mar. 25, 2008, in application No. 04785246.2-1238 PCT/US2004031957, 5 pages.

* cited by examiner

*Primary Examiner* — John Hayes
*Assistant Examiner* — Tonya Joseph
(74) *Attorney, Agent, or Firm* — Finnegan, Henderson, Farabow, Garrett & Dunner, LLP

(57) ABSTRACT

Systems and methods are disclosed for calculating a delivery date. The disclosed systems and methods may include receiving, at a delivery processor, origin data corresponding to an origin delivery office that receives an item to be sent, the origin data comprising origin location information, a scan date reflecting a date the item is scanned at the origin delivery office, and a scan time reflecting a time the item is scanned at the origin delivery office. The delivery processor determines whether the scan time is before a cut-off acceptance time for scanning items at the origin delivery office and sets a start date and time based on the scan time determination. The delivery processor also determines a first estimated date and time that the item will be scanned at an outbound delivery office, and determines a second estimated date and time that the item will be scanned at an inbound delivery office. Thereafter, the delivery processor calculates the estimated delivery date based on the start date and time, the first estimated date and time, and the second estimated date and time, and provides the estimated delivery date to a source data processor.

40 Claims, 6 Drawing Sheets

METHODS AND SYSTEMS FOR POSTCODE-TO-POSTCODE DELIVERY INTERVAL AND ROUTING CALCULATION

RELATED APPLICATIONS

This application claims the benefit of U.S. Provisional Patent Application No. 60/570,827, entitled "Methods and Systems for Postcode-to-Postcode Delivery Interval and Routing Calculation," which was filed on May 14, 2004, the disclosure of which is hereby expressly incorporated herein by reference.

TECHNICAL FIELD

The present invention generally relates to methods and systems for calculating a delivery date. More particularly, the present invention relates to calculating a delivery date using, for example, a postcode database.

BACKGROUND

The United States Postal Service (USPS) is an independent government agency that provides mail delivery and other services to the public. The USPS is widely recognized as a safe and reliable means for sending and receiving mail and other items. With the advent and steady growth of electronic mail and electronic commerce, the physical mail stream will increasingly be utilized for sending and receiving packages and other items. In the context of item delivery, a delivery system operator or an item sender may desire, for example, to calculate a delivery date for an item.

Therefore, the need to efficiently calculate a delivery date for an item has become a common need for the United States Postal Service and other organizations. More specifically, efficiently calculating a delivery date using a postcode database has become a critical service for many delivery system operators. This is because in an increasingly competitive environment, meeting and exceeding the expectations of those who receive a service is essential for a service provider.

SUMMARY

Consistent with embodiments of the present invention, systems and methods are disclosed for calculating a delivery date. Systems and method consistent with the present invention receive, at a delivery processor, origin data corresponding to an origin delivery office that receives an item to be sent, the origin data comprising origin location information, a scan date reflecting a date the item is scanned at the origin delivery office, and a scan time reflecting a time the item is scanned at the origin delivery office. The delivery processor determines whether the scan time is before a cut-off acceptance time for scanning items at the origin delivery office and sets a start date and time based on the scan time determination. The delivery processor also determines a first estimated date and time that the item will be scanned at an outbound delivery office, and determines a second estimated date and time that the item will be scanned at an inbound delivery office. Thereafter, the delivery processor calculates the estimated delivery date based on the start date and time, the first estimated date and time, and the second estimated date and time, and provides the estimated delivery date to a source data processor.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
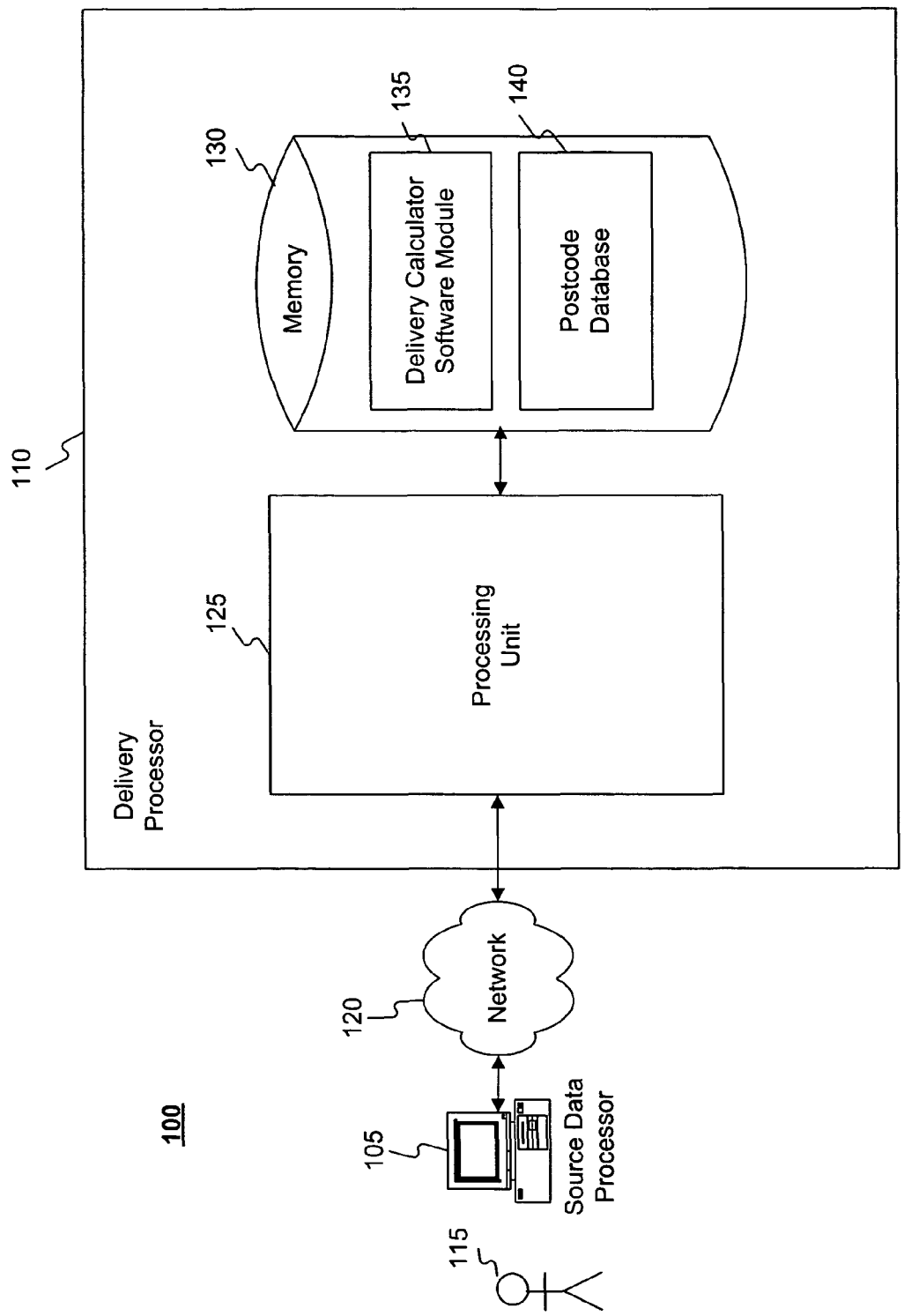
FIG. 1 is a block diagram of an exemplary delivery date calculating system consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Systems and methods consistent with embodiments of the present invention may calculate a delivery date. For example, a postcode database schema may provide the foundation to build a database that can associate every international and domestic postcode to its associated city name, province name, and delivery office. In addition, this schema may link the shipping process from end-to-end between any two postcodes respective, for example, of routing, flight schedules, observed holidays, and time zones. This database schema may support, for example, the development of the Global Express Mail Guarantee Calculator, used by the USPS. The Global Express Mail Guarantee Calculator may determine an actual end-to-end delivery date from, for example, each origin postcode to each destination postcode in the international arena and by level of service.

An embodiment consistent with the invention may comprise a system for calculating a delivery date. The system may comprise a memory storage for maintaining a database and a processing unit coupled to the memory storage. The processing unit may be operative to receive origin data corresponding to a first delivery office from which an item is to be sent, the origin data comprising an origin country, an origin city, an origin state/province, an origin postcode, a date the item is received at the first delivery office, and a time the item is received at the first delivery office. Furthermore, the processing unit may be operative to receive destination data corresponding to a second delivery office to which the item is to be sent, the destination data comprising a destination country, a destination city, a destination state/province, and a destination postcode. In addition, the processing unit may be operative to receive a level of service data. Also, the processing unit may be operative to calculate the delivery date for the item using the origin data, the destination data, and the level of service data, wherein calculating the delivery date is performed respective of routing, flight schedules, observed holidays, and time zones, the delivery date comprising a date on which the item is to be delivered.

Consistent with an embodiment of the present invention, the aforementioned memory, processing unit, and other components may be implemented in a delivery date calculating system, such as an exemplary delivery date calculating system 100 of FIG. 1. Any suitable combination of hardware, software and/or firmware may be used to implement the memory, processing unit, or other components. By way of example, the memory, processing unit, or other components may be implemented with any of a source data processor 105 or a delivery processor 110, in combination with system 100. The aforementioned system and processors are exemplary and other systems and processors may comprise the aforementioned memory, processing unit, or other components, consistent with embodiments of the present invention.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

By way of a non-limiting example, FIG. 1 illustrates system 100 in which the features and principles of the present invention may be implemented. As illustrated in the block diagram of FIG. 1, system 100 may include source data processor 105, delivery processor 110, a user 115, and a network 120. User 115 may be an individual, for example, desiring to calculate a delivery date using delivery processor 110. User 115 may also be an organization, enterprise, or any other entity having such desires.

Delivery processor 110 may include a processing unit 125 and a memory 130. Memory 130 may include delivery calculator software module 135 and a postcode database 140. Processing unit 125 may access postcode database 140. Delivery calculator software module 135, residing in memory 130, may be executed on processing unit 125 to perform processes consistent with embodiments of the present invention. For example, delivery calculator software module 135, executed on processing unit 125 and accessing postcode database 140, may simulate the activities shown in FIG. 2 through FIG. 4 to calculate a delivery date for an item. Delivery processor 110 may receive input data used to calculate the delivery date from source data processor 105 over network 120 and may provide the calculated delivery date (output) to source data processor 105 over network 120. FIG. 5, as described below, illustrates how the input data may be received and how the calculated delivery date may be provided.

Source data processor 105 or delivery processor 110 ("the processors") included in system 100 may be implemented using a personal computer, network computer, mainframe, or other similar microcomputer-based workstation. The processors may be implemented in any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, any of the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

Network 120 may comprise, for example, a local area network (LAN) or a wide area network (WAN). Such networking environments are commonplace in offices, enterprise-wide computer networks, intranets, and the Internet, and are known by those skilled in the art. When a LAN is used as network 120, a network interface located at any of the processors may be used to interconnect any of the processors. When network 120 is implemented in a WAN networking environment, such as the Internet, the processors may typically include an internal or external modem (not shown) or other means for establishing communications over the WAN. Internal or external modems may also include routers for network communication clarity. Further, in utilizing network 120, data sent over network 120 may be encrypted to insure data security by using known encryption/decryption techniques.

In addition to utilizing a wire line communications system as network 120, a wireless communications system, or a combination of wire line and wireless may be utilized as network 120 in order to, for example, exchange web pages via the Internet or an Intranet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission.

System 100 may also transmit data by methods and processes other than, or in combination with, network 120. These methods and processes may include, but are not limited to, transferring data via diskette, CD ROM, facsimile, conventional mail, memory stick, an interactive voice response system (IVR), or via voice over a publicly switched telephone network.

A delivery path for an item may include multiple portions, or "legs" referred to as "leg one," "leg two," "leg three," etc. Each leg may have its own completion date.

Figure 2A:
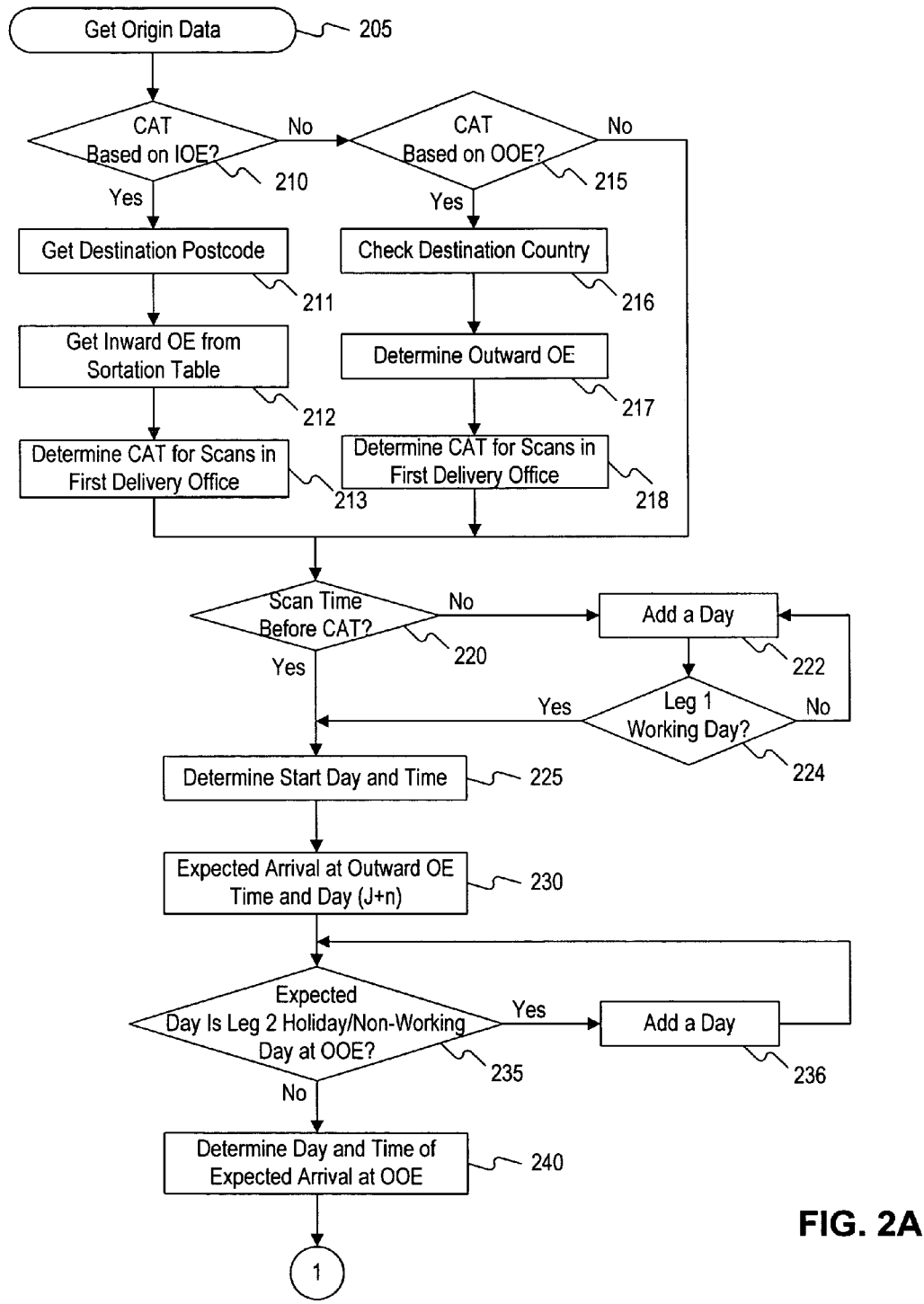
FIGS. 2A and 2B are flowcharts illustrating a first leg of an exemplary method for calculating a delivery date of an item consistent with an embodiment of the present invention.
Figure 2B:
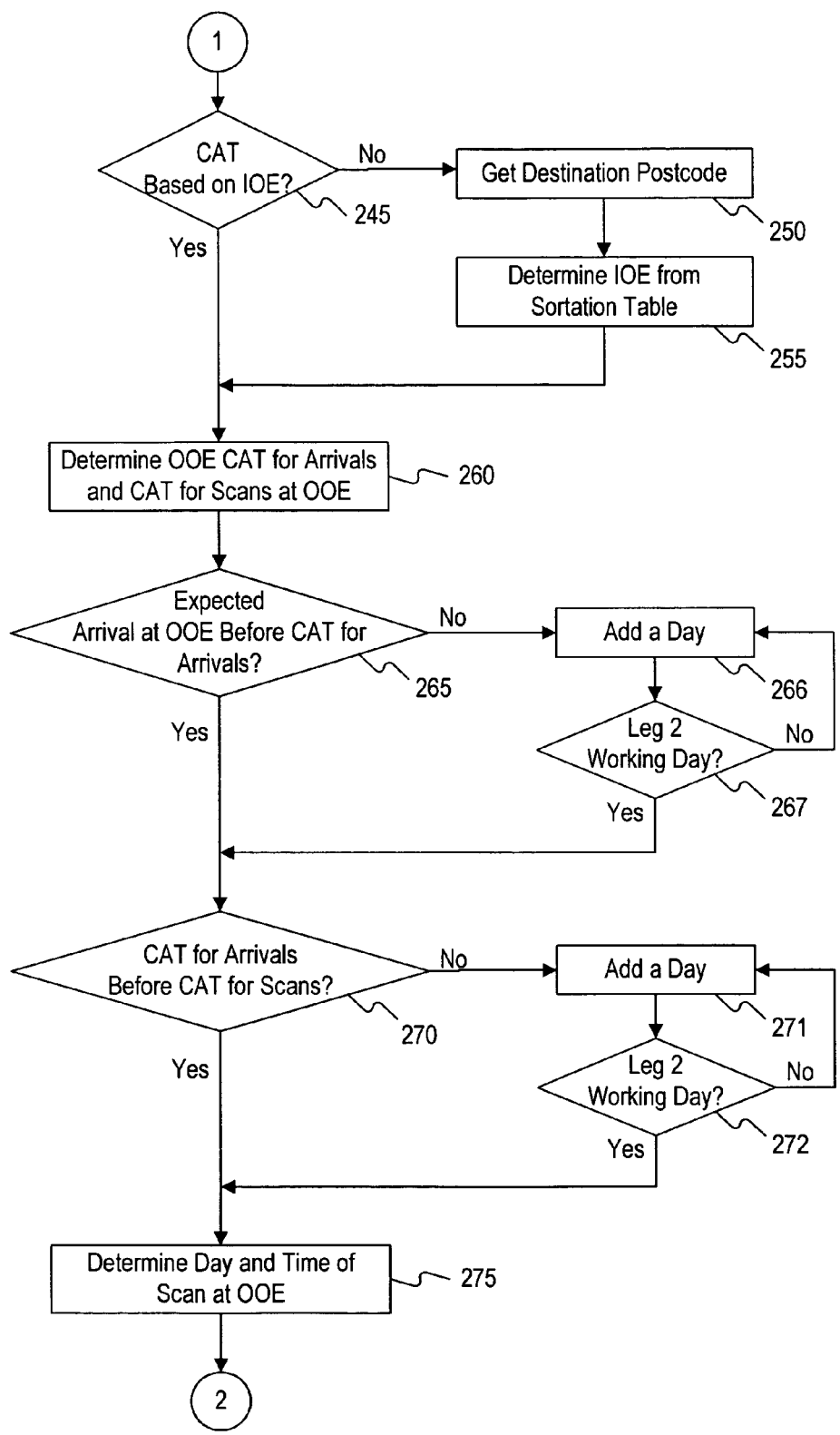
Figure 3:
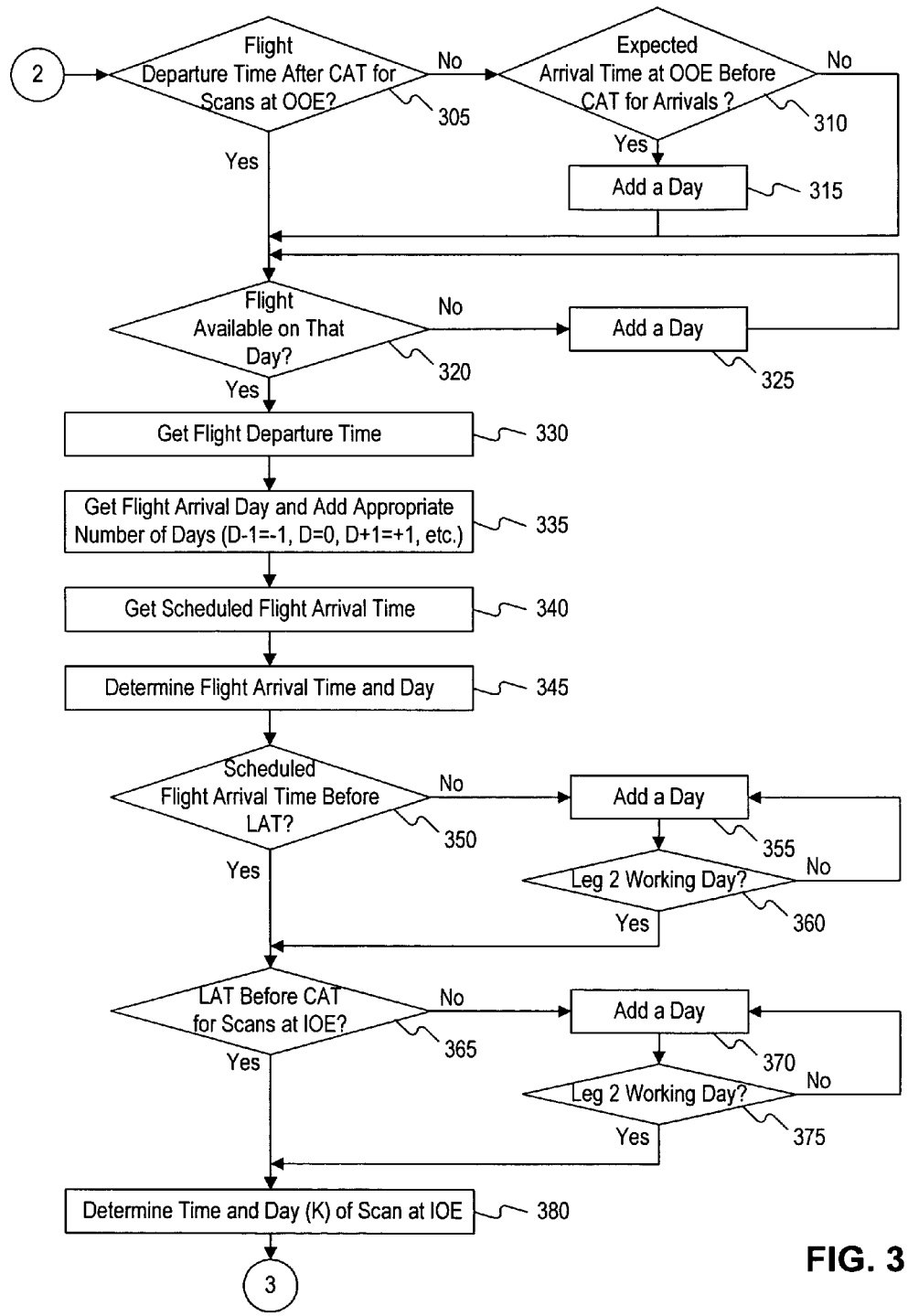
FIG. 3 is a flowchart illustrating a second leg of an exemplary method for calculating a delivery date of an item consistent with an embodiment of the present invention.
Figure 4:
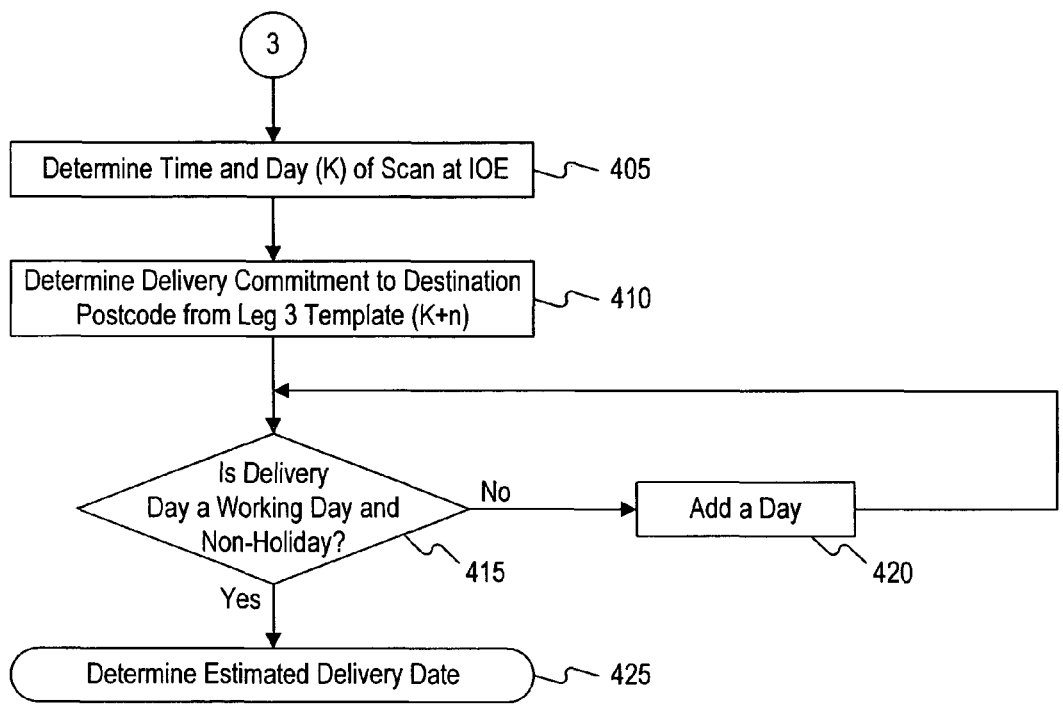
FIG. 4 is a flowchart illustrating a third leg of an exemplary method for calculating a delivery date of an item consistent with an embodiment of the present invention.
Figure 5:
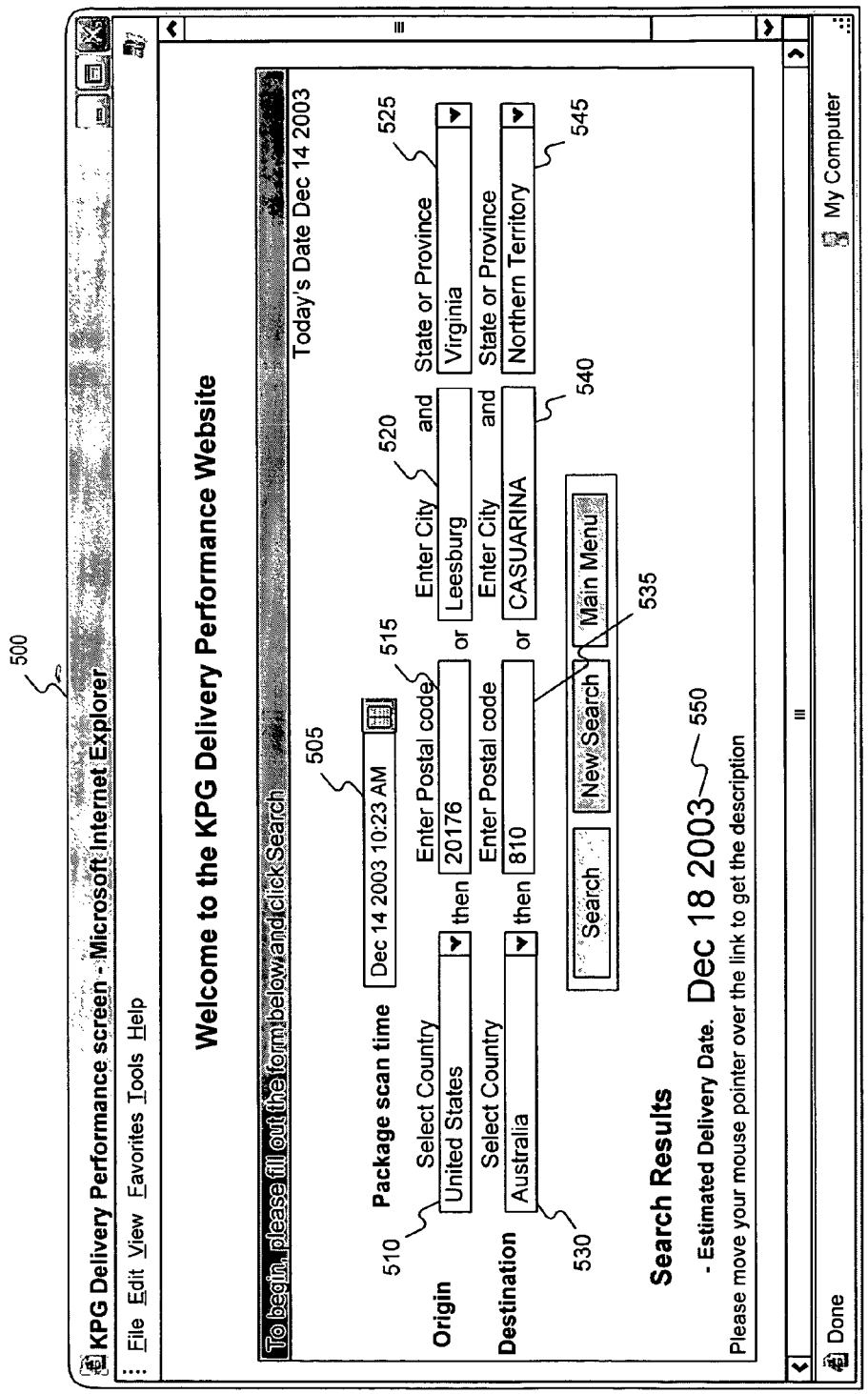
FIG. 5 is a screen shot illustrating the results of a delivery date calculation consistent with an embodiment of the present invention.

FIGS. 2A and 2B illustrate determining a leg one date, FIG. 3 illustrates determining a leg two date, and FIG. 4 illustrates determining a leg three date. More specifically, for an item to be shipped, for example, from an origin country to a destination country, FIGS. 2A and 2B illustrate a method for determining the time needed to receive and process the item up to its departure from the origin country (the leg one date.) Furthermore, FIG. 3 illustrates a method for determining the time needed to process and transport the item from the origin country to the destination country (the leg two date.) Moreover, FIG. 4 illustrates a method for determining the time needed to receive the item from an airline at the destination country, process the item, and deliver the item to the recipient (customer) in the destination country (the leg three date.) By adding the time determined in each leg to the time the item is received at the first delivery office, the delivery date may be determined. For example, processor 110 may simulate the methods described in FIGS. 2A through 4 and use postcode database 140 to calculate the delivery date. One of ordinary skill in the art will appreciate that while the aforementioned legs were described in conjunction with an origin country and a destination country, the origin and destination may alternatively be within the same country.

FIGS. 2A and 2B are flowcharts illustrating an exemplary method for determining the time needed to receive an item up to its departure from its place of origin consistent with an embodiment of the present invention. Although the steps of the flowchart are described in a particular order, one skilled in the art will appreciate that these steps may be performed in a modified or different order. Further, one or more of the steps in FIGS. 2A and 2B may be performed concurrently or in parallel.

As shown in FIG. 2A, processor 110 may receive origin data (step 205). For example, a first delivery office, such as a USPS post office or other delivery office, may receive an item to be sent to a destination from a customer. After the item is received, it may be scanned or otherwise noted by the delivery office. A user, such as user 115, that desires to determine an estimated delivery date for the item may enter origin data for the item at source data processor 105. Origin data may include one or more of origin location information (which may include one or more of an origin country, an origin city, an origin state/province, and an origin postcode), a date the item is received at the first delivery office, and a time the item is received at the first delivery office. Source data processor 105 may, for example, send the origin data to processor 110. Based on the origin data, processor 110 may assess whether the first delivery office are one of several types of office.

A first type is a delivery office whose cut-off acceptance times (CAT) are predicated on the Inward Office of Exchange (IOE) of the destination region or country (step 210). For example, Hong Kong utilizes such cut-off acceptance times. If the cut-off acceptance times are predicated as described above, processor 110 may require input of the destination postcode (step 211). For example, processor 110 may send a request for the destination postcode or other destination data to source data processor 105, if this information has not already been submitted (e.g., information may already be submitted if the destination data was entered by a user when the user entered the origin data). Destination data may include one or more of a destination country, a destination state/province, a destination city, and a destination postcode. Processor 110 may then use the destination postcode or other destination data in order to determine the IOE (step 212). For example, processor 110 may access postcode database 140 for this information. Processor 110 may use the identification of the IOE to determine the cut-off acceptance time for scanning or otherwise noting items for the first delivery office for the day of the week on which the item was scanned (step 213). For example, processor 110 may access postcode database 140 to determine the relevant cut-off acceptance time that corresponds to the identified IOE.

A second type of delivery office is a delivery office whose cut-off acceptance times are predicated on Outward Office of Exchange (OOE) routing, based on the origin country or territory (step 215). For example, China utilizes such cutoff acceptance times. If the cut-off acceptance times are predicated as described above, processor 110 may require input of the origin country (step 216). For example, processor 110 may send a request for the origin country or other origin data to source data processor 105, if this information has not already been submitted. Processor 110 may then use the origin country or other origin data in order to determine the OOE (step 217). For example, processor 110 may access postcode database 140 for this information. Processor 110 may use the identification of the OOE to determine the cut-off acceptance time for or otherwise noting scanning items for the first delivery office for the day of the week on which the item was scanned (step 218). For example, processor 110 may access postcode database 140 to determine the relevant cut-off acceptance time that corresponds to the identified OOE.

A third type of delivery office is a delivery office not meeting the criteria displayed in the two paragraphs immediately above. In this case, processor 110 may lookup a cut-off acceptance time that corresponds to the delivery office itself.

Processor 110 may determine if the scan of the item occurred before or after the cut-off acceptance time for scanning items at the first delivery office (step 220). If the item is received after the cut-off acceptance time, the processor may add a day to the start date (step 222). Thereafter, processor 110 may determine if the new date is (step 224):

a) a Leg 1 national holiday of that country/territory;
b) a Leg 1 regional holiday of the postcode; or
c) a Leg 1 non-working day.

If any of these cases apply, processor 110 may return to step 222 and loop through step 224 until such time as a working day is found that constitutes the start day and time (J) (step 225). If the item scan was assessed in step 220 to be before the cut-off acceptance time, the processor 110 may move directly to step 225.

Processor 110 may be able to determine the expected arrival date and time at an outbound delivery office, such as an OOE, based on the start day and time determined in step 225 (step 230). For example, processor 110 may access information that indicates how long it takes to transport an item from the first delivery office to the OOE, and add that length to J. The processor may then assess if the day of the expected arrival is a Leg 2 non-working day (step 235). In the event the expected arrival at the OOE is a Leg 2 non-working day, the processor 110 may add a day (step 236) and loop back through step 235 until reaching a valid working day. Processor 110 may then determine the date and time of expected arrival at the OOE (step 240). One of ordinary skill in the art will recognize that this date and time may the same as that determined in step 230 if the initial expected arrival day was not a Leg 2 non-working day.

In step 245 (FIG. 2B), processor 110 may determine whether the country/territory of origin qualified for steps 210 through 213 (e.g., cut-off acceptance times are predicated on the IOE of the destination region or country). If the item did not qualify for steps 210 through 213, processor 110 may assess the destination postcode (step 250) in order to determine the IOE (step 255). Identification of the IOE may enable the processor to determine the cut-off acceptance time for arrivals at the OOE and its corresponding cut-off acceptance time for scanning or otherwise noting items at the OOE (step 260).

In step 265, processor 110 may proceed to compare the expected arrival time at the OOE (e.g., as determined in step 230) with the cut-off acceptance time for arrivals at the OOE (e.g., as determined in step 260). If the item is scheduled to arrive at the OOE after the cut-off acceptance time for arrivals, processor 110 may add a day to the expected delivery date (step 266) and verify that the new date is a leg 2 working day (step 267), or loop back around to step 266 until such time as a working day is found.

In step 270, processor 110 may compare the cut-off acceptance time for arrivals to the cut-off acceptance time for scanning items at the OOE. If the cut-off acceptance time for scanning items at the OOE is before the cut-off acceptance time for arrivals, processor 110 may add a day to the expected delivery date (step 271) and verify that the new date is a leg 2 working day (step 272), or loop back around to step 271 until such time as a working day is found. Processor 110, as a result, may establish the estimated time and date of scanning the item at the OOE (step 275).

FIG. 3 is a flowchart illustrating a method for determining the time needed to process and transport the item from the origin country to the destination country consistent with an embodiment of the present invention. Although the steps of the flowchart are described in a particular order, one skilled in the art will appreciate that these steps may be performed in a modified or different order. Further, one or more of the steps in FIG. 3 may be performed concurrently or in parallel.

As shown in FIG. 3, in step 305, processor 110 may assess whether the earliest flight departure for that particular day is after the estimated time and date of scanning the item at the OOE determined in stage 275. If the flight departure is prior to the estimated time and date of scanning the item at the OOE, processor 110 may investigate whether steps 266 and 267 occurred (step 310). If steps 266 and 267 did not occur, processor 110 may add a day to the estimated delivery date (step 315). If steps 266 and 267 occurred, processor 110 may directly proceed to step 320 to check availability of flights on that day.

If a flight is not available on that day, processor 110 may add a day (step 325) and check whether a flight is available on the new date. Processor 110 may repeat this process until a flight is found. Once an available flight is found, processor 110 may determine the flight departure time (step 330). Processor 110 may then add the duration time of the flight in terms of date (step 335) and in terms of time (step 340) to produce the flight arrival date and time in local time (step 345).

Processor 110 may assess whether the scheduled flight arrival is before the Latest Arrival Time (LAT) (step 350). LAT may refer to a cut-off time after which arriving items on a flight are not processed until the next day. In the event the scheduled flight arrival is after the LAT, processor 110 may add a day to the estimated delivery date (step 355), then check whether the new date is a Leg 2 working day (step 360), re-looping through step 355 as required. Thereafter, processor 110 may determine whether the LAT is before the cut-off acceptance time for scanning items at an inbound delivery office, such as an IOE (step 365). In step 370, processor 110 may add a day to the estimated delivery date if the LAT is later than that of the cut-off acceptance time for scanning items at an inbound delivery office. Processor 110 may also check whether the new day is a Leg 2 working day (step 375) and repeat step 370 as necessary. Processor 110 as a result, may establish the estimated time and date of scanning the item at the inbound delivery office (step 380) as the last measure of Leg 2 and the first measure of Leg 3.

FIG. 4 is a flowchart illustrating a method for determining the time needed to receive the item from an airline at the destination country, process the item, and deliver the item to the recipient, consistent with an embodiment of the present invention. Although the steps of the flowchart are described in a particular order, one skilled in the art will appreciate that these steps may be performed in a modified or different order. Further, one or more of the steps in FIG. 4 may be performed concurrently or in parallel.

As shown in FIG. 4, processor 110 may utilize the estimated time and date of scanning the item at the inbound delivery office derived in step 380 to establish "K" as the day of departure from the inbound delivery office (step 405). Processor 110 may add to K the number of days required for delivery for the destination postcode of the item, thus determining an initial anticipated date of delivery for the item (step 410). Processor 110 may subsequently check whether the anticipated date is a non-delivery day, a national or a regional holiday, etc. (step 415) and add a day as appropriate (step 420) to produce a new anticipated delivery date. Processor 110 may then re-loop through step 415 until such time as the anticipated delivery date is a working day and not a holiday. Processor 110 sets the resulting data as the estimated date of delivery for the item (step 425).

One of ordinary skill in the art will appreciate that the scanning that occurs in FIGS. 2-4 may be implemented using any known modes of scanning, such as barcode scanning. Moreover, instead of scanning items, methods and systems consistent with the present invention may alternatively utilize radio frequency identification (RFID) technology, or any technology that can uniquely identify items.

FIG. 5 shows a screen shot 500 illustrating the results of a delivery date calculation consistent with an embodiment of the present invention. As shown in FIG. 5, screen shot 500 may illustrate an exemplary output of delivery date calculating system 100 that may be displayed on source data processor 105. For example, information entered in an origin country field 510 may comprise the "United States," information entered in an origin city field 520 may comprise "Leesburg," information entered in an origin state/province field 525 may comprise "Virginia," and information entered in an origin postcode 515 may comprise "20176." Moreover, information entered in a destination country field 530 may comprise the "Australia," information entered in a destination city field 540 may comprise "Casuarina," information entered in a destination state/province field 545 may comprise "Northern Territory," and a information entered in destination postcode 535 may comprise "810." Furthermore, a date the item is received at the first delivery office and a time the item is received at the first delivery office may be included in field 505 and may comprise "Dec. 14, 2003 at 10:23 AM."

Consistent with an embodiment of the invention, processor 110 may receive the data entered in fields 505 through 545 from processor 105 and may calculate a guaranteed delivery date for the item using, for example, at least the data contained in fields 505 through 545. As described above, delivery calculator software module 135, residing in memory 130, may be executed on processing unit 125 to calculate the delivery date for the item using, for example, at least the data contained in fields 505 through 545. The delivery date may be provided to user 115 by system 100 by providing the delivery date in a delivery date field 550 of screen shot 500. As shown in FIG. 5, given the aforementioned data, the guaranteed delivery date (e.g., estimated delivery date) may comprise "Dec. 18, 2003," as shown in deliver date field 550.

While certain features and embodiments of the invention have been described, other embodiments of the invention will be apparent to those skilled in the art from consideration of the specification and practice of the embodiments of the invention disclosed herein. For example, although FIGS. 2-4 depict three legs involved in determining an estimated delivery date of an item, one of ordinary skill in the art will appreciate that more or fewer legs may be utilized by processor 110 to make this determination, based on the logistics involved with the delivery of the item (e.g., perhaps no air travel is involved, or the delivery occurs entirely within the same country, etc.). Moreover, a level of service associated with the delivery of the item may alter the estimated delivery date, such that a higher level of service may result in an estimated delivery date that is earlier than a date associated with a lower level of service. Level of service data, for example, may be provided by a user when entering other data corresponding to the item, such as the origin data and/or destination data, and may be subsequently provided to processor 110.

One of ordinary skill in the art will also appreciate that modes of transportation other than air travel may be used to transport items. For example, items may be transported using railways, roadways, or other surface transportation. Any combination of different transportation modes may be used to transport items.

Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method for calculating an estimated international delivery date, comprising:
   receiving, at a delivery processor, destination data comprising a destination address and a destination country of an item to be sent and origin data corresponding to an origin delivery office that receives the item to be sent, the origin data comprising origin location information, a scan date reflecting a date the item is scanned at the origin delivery office, and a scan time reflecting a time the item is scanned at the origin delivery office;
   based on the origin data, determining whether a cut-off acceptance time of the origin delivery office is predicated on an Inward Office Exchange or an Outward Office Exchange;
   if the cut-off acceptance time of the origin delivery office is predicated on an Inward Office Exchange, ascertaining the cut-off acceptance time of the origin delivery office based on at least the destination data;
   if the cut-off acceptance time of the origin delivery office is predicated on an Outward Office Exchange, ascertaining the cut-off acceptance time of the origin delivery office based on at least the origin data;
   determining whether the scan time is before the ascertained cut-off acceptance time;
   setting a start date and time for calculating the estimated international delivery date based on the scan time determination;
   determining a first estimated date and time that the item will be scanned at an outbound delivery office of the origin country, using the start date and time;
   determining a second estimated date and time that the item will be scanned at an inbound delivery office of the destination country;
   determining a third estimated date and time representing delivery of the item from the inbound delivery office of the destination country to the address from the destination data;
   calculating, by a processing unit, the estimated international delivery date based on the first estimated date and time, the second estimated date and time, and the third estimated date and time; and
   providing the calculated estimated international delivery date to a source data processor
   wherein determining the second estimated date and time comprises: determining a flight having a flight departure time for the destination country after the first estimated date and time;
   determining a scheduled flight arrival day and a scheduled flight arrival time for the flight;
   making a third determination as to whether the scheduled flight arrival time is before a latest arrival time for flights that permits same-day processing of the item at the inbound delivery office;
   making a fourth determination as to whether the latest arrival time for flights is before a cut-off acceptance time for scans at the inbound delivery office; and
   setting the second estimated date and time according to the third determination and the fourth determination.

2. The method of claim 1, wherein the origin location information comprises one or more of the origin country, an origin city, an origin state/province, and an origin postcode.

3. The method of claim 1, wherein the cut-off acceptance time is for a day corresponding to the scan date.

4. The method of claim 1, wherein
   the destination data further comprises one or more of a destination city, a destination state/province, and a destination postcode.

5. The method of claim 1, wherein ascertaining comprises:
   identifying a specific inbound delivery office corresponding to the destination country; and
   choosing the cut-off acceptance time based on the specific inbound delivery office.

6. The method of claim 1, wherein setting a start date and time comprises:
   adding a day to the start date to create a new start date based on a determination that the scan time is after the cut-off acceptance time.

7. The method of claim 6, further comprising:
   determining whether the new start date is a holiday or non-working day; and
   adding a day to the new start date until the new start date is a working day, based on a determination that the new start date is a holiday or non-working day.

8. The method of claim 1, wherein determining the first estimated date and time comprises:
   calculating an expected arrival date and time for the item at an outbound delivery office of the origin country, starting from the start date and time;
   making a first determination as to whether the expected arrival date and time is before a cut-off acceptance time for arrivals at the outbound delivery office;
   making a second determination as to whether the cut-off acceptance time for arrivals at the outbound delivery office is before a cut-off acceptance time for scans at the outbound delivery office; and
   setting the first estimated date and time according to the first determination and the second determination.

9. The method of claim 1, wherein determining the third estimated date and time comprises:
   determining an estimated departure day on which the item departs from the inbound delivery office based on the second estimated date and time;
   determining a number of days required for delivery of the item from the inbound delivery office to the destination address;
   adding the number of days to the estimated departure day to produce an anticipated date of delivery for the item; and
   setting the third estimated date to the anticipated date upon confirming that the anticipated date of delivery is a non-holiday and a working day in the destination country.

10. The method of claim 1, further comprising:
receiving level of service data, wherein the estimated delivery date is further based on the level of service data.

11. An apparatus for calculating an estimated international delivery date, comprising:
means for receiving, at a delivery processor, destination data comprising a destination address and a destination country of an item to be sent and origin data corresponding to an origin delivery office that receives the item to be sent, the origin data comprising origin location information, a scan date reflecting a date the item is scanned at the origin delivery office, and a scan time reflecting a time the item is scanned at the origin delivery office;
means for determining, based on the origin data, whether a cut-off acceptance time of the origin delivery office is predicated on an Inward Office Exchange or an Outward Office Exchange;
means for ascertaining, based on the determination of whether the cut-off acceptance time of the origin delivery office is predicated on the Inward Office Exchange or the Outward Office Exchange, the cut-off acceptance time of the origin delivery office, wherein
if the cut-off acceptance time of the origin delivery office is predicated on an Inward Office Exchange, ascertaining the cut-off acceptance time of the origin delivery office based on at least the destination data; and
if the cut-off acceptance time of the origin delivery office is predicated on an Outward Office Exchange, ascertaining the cut-off acceptance time of the origin delivery office based on at least the origin data;
means for determining whether the scan time is before the ascertained cut-off acceptance time;
means for setting a start date and time for calculating the estimated international delivery date based on the scan time determination;
means for determining a first estimated date and time that the item will be scanned at an outbound delivery office of the origin country, using the start date and time;
means for determining a second estimated date and time that the item will be scanned at an inbound delivery office of the destination country;
means for determining a third estimated date and time representing delivery of the item from the inbound delivery office of the destination country to the address from the destination data;
means for calculating the estimated international delivery date based on the first estimated date and time, the second estimated date and time, and the third estimated date and time; and
means for providing the calculated estimated international delivery date to a source data processor,
wherein the means for determining the second estimated date and time comprises: means for determining a flight having a flight departure time for the destination country after the first estimated date and time;
means for determining a scheduled flight arrival day and a scheduled flight arrival time for the flight; means for making a third determination as to whether the scheduled flight arrival time is before a latest arrival time for flights that permits same-day processing of the item at the inbound delivery office;
means for making a fourth determination as to whether the latest arrival time for flights is before a cut-off acceptance time for scans at the inbound delivery office; and
means for setting the second estimated date and time according to the third determination and the fourth determination.

12. The apparatus of claim 11, wherein the origin location information comprises one or more of the origin country, an origin city, an origin state/province, and an origin postcode.

13. The apparatus of claim 11, wherein the cut-off acceptance time is for a day corresponding to the scan date.

14. The apparatus of claim 11, wherein
the destination data further comprises one or more of a destination city, a destination state/province, and a destination postcode.

15. The apparatus of claim 11, wherein the means for ascertaining comprises:
means for identifying a specific inbound delivery office corresponding to the destination country; and
means for choosing the cut-off acceptance time based on the specific inbound delivery office.

16. The apparatus of claim 11, wherein the means for setting a start date and time comprises:
means for adding a day to the start date to create a new start date based on a determination that the scan time is after the cut-off acceptance time.

17. The apparatus of claim 16, further comprising:
means for determining whether the new start date is a holiday or non-working day; and
means for adding a day to the new start date until the new start date is a working day, based on a determination that the new start date is a holiday or non-working day.

18. The apparatus of claim 11, wherein the means for determining the first estimated date and time comprises:
means for calculating an expected arrival date and time for the item at an outbound delivery office of the origin country, starting from the start date and time;
means for making a first determination as to whether the expected arrival date and time is before a cut-off acceptance time for arrivals at the outbound delivery office;
means for making a second determination as to whether the cut-off acceptance time for arrivals at the outbound delivery office is before a cut-off acceptance time for scans at the outbound delivery office; and
means for setting the first estimated date and time according to the first determination and the second determination.

19. The apparatus of claim 11, wherein the means for determining the third estimated date and time comprises:
means for determining an estimated departure day on which the item departs from the inbound delivery office based on the second estimated date and time;
means for determining a number of days required for delivery of the item from the inbound delivery office to the destination address;
means for adding the number of days to the estimated departure day to produce an anticipated date of delivery for the item; and
means for setting the third estimated date to the anticipated date upon confirming that the anticipated date of delivery is a non-holiday and a working day in the destination country.

20. The apparatus of claim 11, further comprising:
means for receiving level of service data, wherein the estimated delivery date is further based on the level of service data.

21. A computer-readable medium storing instructions executable by a processor to perform a method of calculating an estimated international delivery date, the method comprising:
receiving, at a delivery processor, destination data comprising a destination address and a destination country of an item to be sent and origin data corresponding to an origin delivery office that receives the item to be sent, the origin data comprising origin location information, a scan date reflecting a date the item is scanned at the origin delivery office, and a scan time reflecting a time the item is scanned at the origin delivery office;

based on the origin data, determining whether a cut-off acceptance time of the origin delivery office is predicated on an Inward Office Exchange or an Outward Office Exchange;

if the cut-off acceptance time of the origin delivery office is predicated on an Inward Office Exchange, ascertaining the cut-off acceptance time of the origin delivery office based on at least the destination data;

if the cut-off acceptance time of the origin delivery office is predicated on an Outward Office Exchange, ascertaining the cut-off acceptance time of the origin delivery office based on at least the origin data;

determining whether the scan time is before the ascertained cut-off acceptance time;

setting a start date and time for calculating the estimated international delivery date based on the scan time determination;

determining a first estimated date and time that the item will be scanned at an outbound delivery office of the origin country, using the start date and time;

determining a second estimated date and time that the item will be scanned at an inbound delivery office of the destination country;

determining a third estimated date and time representing delivery of the item from the inbound delivery office of the destination country to the address from the destination data;

calculating, using a processing unit, the estimated international delivery date based on the first estimated date and time, the second estimated date and time, and the third estimated date and time; and providing the calculated estimated international delivery date to a source data processor wherein determining the second estimated date and time comprises: determining a flight having a flight departure time for the destination country after the first estimated date and time;

determining a scheduled flight arrival day and a scheduled flight arrival time for the flight;

making a third determination as to whether the scheduled flight arrival time is before a latest arrival time for flights that permits same-day processing of the item at the inbound delivery office;

making a fourth determination as to whether the latest arrival time for flights is before a cut-off acceptance time for scans at the inbound delivery office; and setting the second estimated date and time according to the third determination and the fourth determination.

22. The computer-readable medium of claim 21, wherein the origin location information comprises one or more of the origin country, an origin city, an origin state/province, and an origin postcode.

23. The computer-readable medium of claim 21, wherein the cut-off acceptance time is for a day corresponding to the scan date.

24. The computer-readable medium of claim 21, wherein the destination data further comprises one or more of a destination city, a destination state/province, and a destination postcode.

25. The computer-readable medium of claim 21, wherein ascertaining comprises:
identifying a specific inbound delivery office corresponding to the destination country; and
choosing the cut-off acceptance time based on the specific inbound delivery office.

26. The computer-readable medium of claim 21, wherein setting a start date and time comprises:
adding a day to the start date to create a new start date based on a determination that the scan time is after the cut-off acceptance time.

27. The computer-readable medium of claim 26, further comprising:
determining whether the new start date is a holiday or non-working day; and
adding a day to the new start date until the new start date is and a working day, based on a determination that the new start date is a holiday or non-working day.

28. The computer-readable medium of claim 21, wherein determining the first estimated date and time comprises:
calculating an expected arrival date and time for the item at an outbound delivery office of the origin country, starting from the start date and time;
making a first determination as to whether the expected arrival date and time is before a cut-off acceptance time for arrivals at the outbound delivery office;
making a second determination as to whether the cut-off acceptance time for arrivals at the outbound delivery office is before a cut-off acceptance time for scans at the outbound delivery office; and
setting the first estimated date and time according to the first determination and the second determination.

29. The computer-readable medium of claim 21, wherein determining the third estimated date and time comprises:
determining an estimated departure day on which the item departs from the inbound delivery office based on the second estimated date and time;
determining a number of days required for delivery of the item from the inbound delivery office to the destination address;
adding the number of days to the estimated departure day to produce an anticipated date of delivery for the item; and
setting the third estimated date to the anticipated date upon confirming that the anticipated date of delivery is a non-holiday and a working day in the destination country.

30. The computer-readable medium of claim 21, further comprising:
receiving level of service data, wherein the estimated delivery date is further based on the level of service data.

31. An apparatus for calculating an estimated international delivery date, comprising:
a memory and a processor configured to:
receive destination data comprising a destination address and a destination country of an item to be sent and origin data corresponding to an origin delivery office that receives the item to be sent, the origin data comprising origin location information, a scan date reflecting a date the item is scanned at the origin delivery office, and a scan time reflecting a time the item is scanned at the origin delivery office;
based on the origin data, determine whether a cut-off acceptance time of the origin delivery office is predicated on an Inward Office Exchange or an Outward Office Exchange;
if the cut-off acceptance time of the origin delivery office is predicated on an Inward Office Exchange, ascertaining the cut-off acceptance time of the origin delivery office based at least on the destination data;

if the cut-off acceptance time of the origin delivery office is predicated on an Outward Office Exchange, ascertaining the cut-off acceptance time of the origin delivery office based on at least the origin data;

determine whether the scan time is before the ascertained cut-off acceptance time;

set a start date and time for calculating the estimated international delivery date based on the scan time determination;

determine a first estimated date and time that the item will be scanned at an outbound delivery office of the origin country, using the start date and time;

determine a second estimated date and time that the item will be scanned at an inbound delivery office of the destination country;

determine a third estimated date and time representing delivery of the item from the inbound delivery office of the destination country to the address from the destination data;

calculate the estimated international delivery date based on the first estimated date and time, the second estimated date and time, and the third estimated date and time; and provide the calculated estimated international delivery date to a source data processor; and a processor that runs the program;

determine a flight having a flight departure time for the destination country after the first estimated date and time; determines a scheduled flight arrival day and a scheduled flight arrival time for the flight;

make a third determination as to whether the scheduled flight arrival time is before a latest arrival time for flights that permits same-day processing of the item at the inbound delivery office;

make a fourth determination as to whether the latest arrival time for flights is before a cut-off acceptance time for scans at the inbound delivery office; and set the second estimated date and time according to the third determination and the fourth determination.

32. The apparatus of claim 31, wherein the origin location information comprises one or more of the origin country, an origin city, an origin state/province, and an origin postcode.

33. The apparatus of claim 31, wherein the cut-off acceptance time is for a day corresponding to the scan date.

34. The apparatus of claim 31, wherein, the destination data further comprises one or more of a destination city, a destination state/province, and a destination postcode.

35. The apparatus of claim 31, wherein the program further:
identifies a specific inbound delivery office corresponding to the destination country; and
chooses the cut-off acceptance time based on the specific inbound delivery office.

36. The apparatus of claim 31, wherein the program setting a start date and time comprises:
adding a day to the start date to create a new start date based on a determination that the scan time is after the cut-off acceptance time.

37. The apparatus of claim 36, wherein the program further determines whether the new start date is a holiday or non-working day, and
adds a day to the new start date until the new start date is a working day, based on a determination that the new start date is a holiday or non-working day.

38. The apparatus of claim 31, wherein the program further:
calculates an expected arrival date and time for the item at an outbound delivery office of the origin country, starting from the start date and time;
makes a first determination as to whether the expected arrival date and time is before a cut-off acceptance time for arrivals at the outbound delivery office;
makes a second determination as to whether the cut-off acceptance time for arrivals at the outbound delivery office is before a cut-off acceptance time for scans at the outbound delivery office; and
sets the first estimated date and time according to the first determination and the second determination.

39. The apparatus of claim 31, wherein the program further:
determines an estimated departure day on which the item departs from the inbound delivery office based on the second estimated date and time;
determines a number of days required for delivery of the item from the inbound delivery office to the destination address;
adds the number of days to the estimated departure day to produce an anticipated date of delivery for the item; and
sets the third estimated date to the anticipated date upon confirming that the anticipated date of delivery is a non-holiday and a working day in the destination country.

40. The apparatus of claim 31, the program further receiving level of service data, wherein the estimated delivery date is further based on the level of service data.

* * * * *